G. E. PELLISSIER.
SHEARING TOOL.
APPLICATION FILED DEC. 28, 1908.
958,972.
Patented May 24, 1910.
2 SHEETS—SHEET 1.
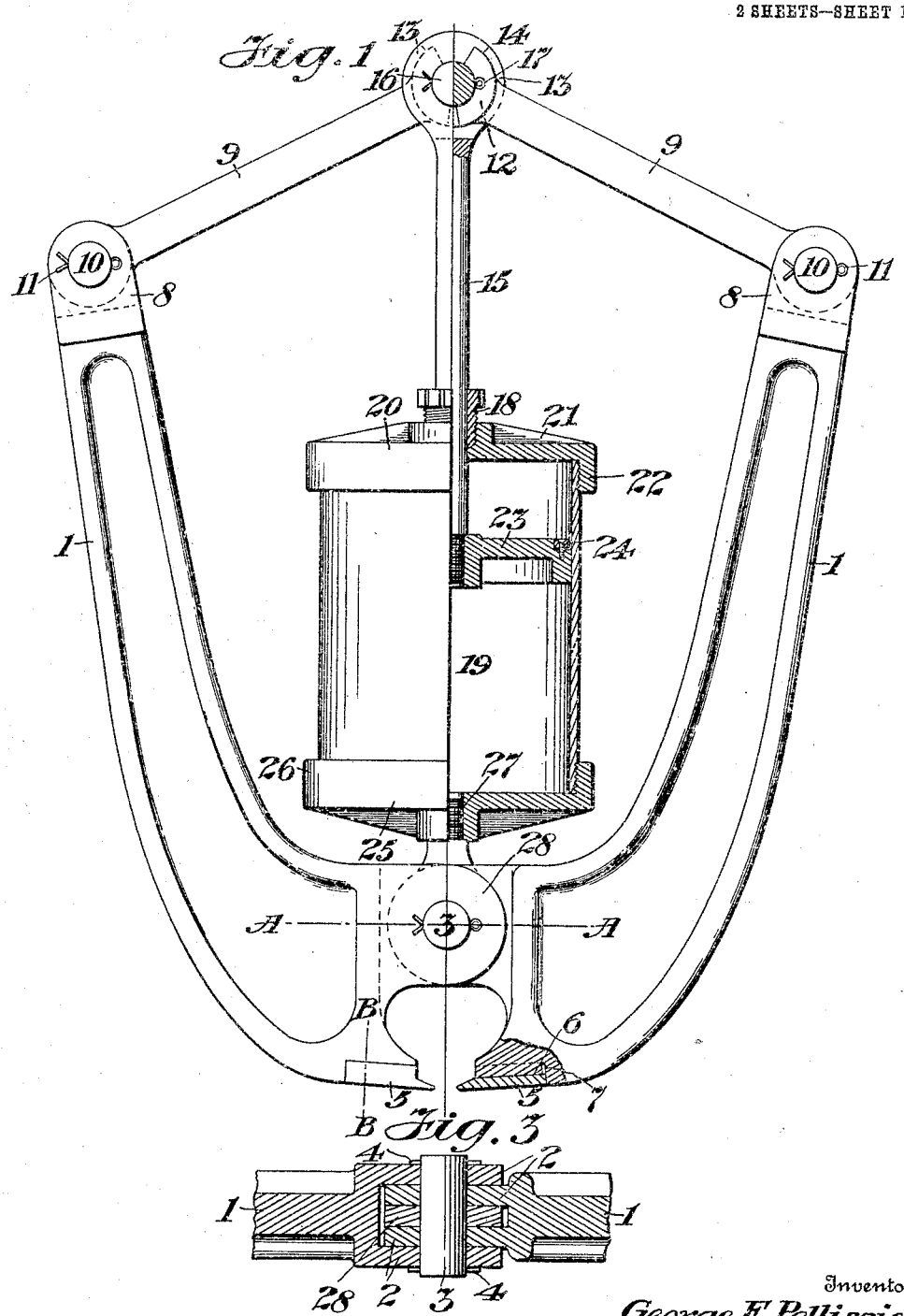
Witnesses
Chas. F. Clagett
J. B. Le Blanc
Inventor
George E. Pellissier
By
Chas. F. Dunn
Attorney

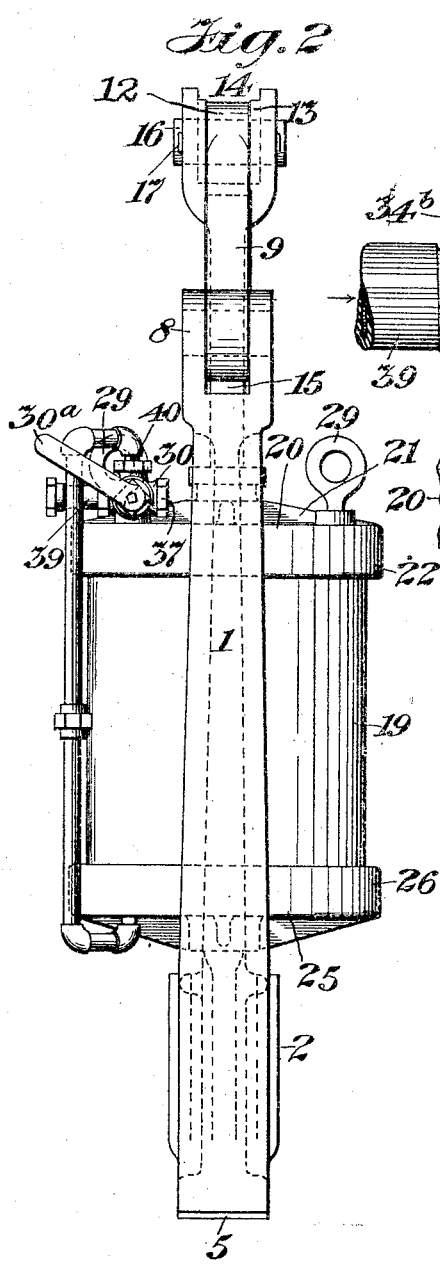
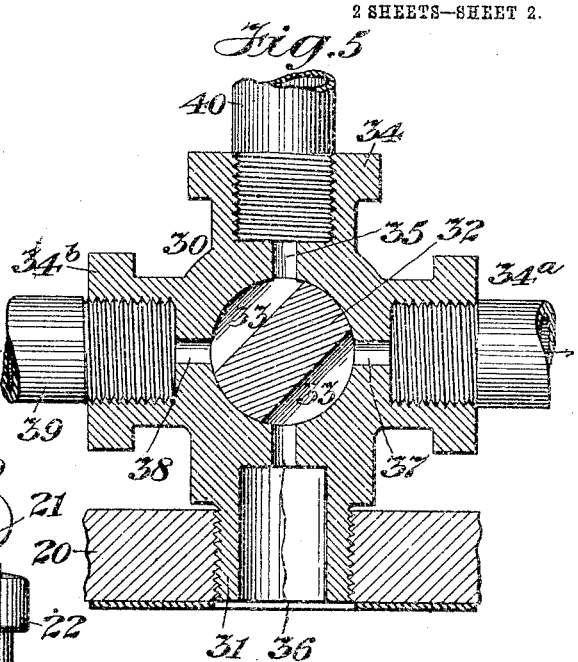

UNITED STATES PATENT OFFICE.

GEORGE EDWARD PELLISSIER, OF HOLYOKE, MASSACHUSETTS, ASSIGNOR TO GOLD-SCHMIDT THERMIT COMPANY, OF NEW YORK, N. Y., A CORPORATION OF NEW YORK.

SHEARING-TOOL.

958,972.   Specification of Letters Patent.   Patented May 24, 1910.

Application filed December 28, 1908. Serial No. 469,584.

*To all whom it may concern:*

Be it known that I, GEORGE EDWARD PELLISSIER, a citizen of the United States, and resident of Holyoke, in the county of Hampden and State of Massachusetts, have invented certain new and useful Improvements in Shearing-Tools, of which the following is a specification.

My invention relates to shearing tools, and more particularly to power operated shears of the clipper type.

The primary object of the invention is to provide a motive fluid actuated shear, which shall be strong and simple in construction, and which may be readily transported from place to place.

A further object is to provide a shear capable of being vertically suspended in operative position from a suitable support, and when actuated in such position, adapted to make a cut in a substantially horizontal plane.

With the above objects in view, and to improve generally upon the details of construction of such apparatus, my invention consists in the various features hereinafter described, and illustrated in the accompanying drawings, in which:—

Figure 1 is a side elevation partly in section of my improved shear complete. Fig. 2 is a side elevation of the same. Fig. 3 is a transverse section on the line A—A of Fig. 1. Fig. 4 is a transverse section on the line B—B of Fig. 1, and Fig. 5 is a transverse section on an enlarged scale, through the four-way cock hereinafter described.

Referring to the drawings in detail, my improved shear comprises a pair of arms 1, preferably of substantially I-shape in cross section. These arms are provided near one end with ears 2, projecting from their inner sides, such ears being formed in pairs, and being interlocked as shown in Fig. 3. A pivot pin 3 passes through openings in said ears, and is held in position as by means of cotter pins 4. To the lower end of said arms near the pivot are attached the removable cutting blades 5, having a dove-tailed tongue-and-groove connection 6, with the arms 1, which arms are provided at the end of such dove-tailed tongue-and-groove connection with square shoulders 7, against which the ends of the cutting blades abut. At the upper ends of said arms, remote from the pivot pin, are formed bifurcated heads 8, to which are connected a pair of toggle levers 9, by means of pins 10, held in place by cotter pins 11. At the joint of said toggle levers is a pivot pin 16, held in position by cotter pins 17, which pin 16 passes through an opening in the end of a piston rod 15. The piston rod head 14 is provided at its sides with arc-shaped flanges 13, which embrace similarly shaped enlargements 12, formed on the ends of the toggle levers 9. The piston rod 15 extends downwardly through a packing gland 18 into a cylinder 19 and, inside of said cylinder, is connected with a piston 23, having the usual leather packing 24. The cylinder 19 has an upper head 20, having radial strengthening ribs 21, and provided with an annular flange 22, into which the body of the cylinder is screwed. The other head 25 of the cylinder is provided with similar strengthening ribs, and also with an annular flange 26, into which the body of the cylinder is screwed. The entire cylinder is supported by means of an eye-bolt 28, fitting down between the ears 2 of the arms, and journaled upon the pivot pin 3. This eye-bolt has, at its upper end, a shank 27, screw-threaded into the cylinder head 25. Thus the parts are rigidly and operatively connected.

In order that my improved shear may be readily manipulated, I provide eye-bolts 29, secured to the upper end of the cylinder, and adapted to receive chains or cables from which the entire shear may be vertically suspended, and by means of which it may be moved about to bring it into the desired relation with the work. It will be noted that when the shear is so suspended, the cutting blades 5 lie so as to move in a substantially horizontal plane.

In order to control the supply of motive fluid to the cylinder (which fluid may be compressed air, steam, or water) I provide a four-way cock 30, which is attached to the upper head 20 of the cylinder. As clearly shown in Fig. 5, the cock has a screw threaded shank 31 which fits into an opening in the cylinder head, and is also provided with three pipe receiving sockets 34, 34$^a$, and 34$^b$, from each of which sockets, ports 35, 36, 37 and 38 extend to the center of the cock. A pipe 40 extends from the port 35 to and through the lower head 25 of the cylinder, and a supply pipe 39 communicates with port 38, while port 37 constitutes the exhaust. An operating handle 30ª is secured to the rotating plug 32 of the cock, which plug has cutaway portions 33 adapted to form communication between the several ports, as the plug is rotated to its various positions. In the position of parts illustrated in Fig. 5, for example, it will be seen that pressure from the pipe 39 is being admitted through the ports 38 and 35 to the pipe 40, and thence to the lower side of the piston, forcing such piston up and opening the jaws of the shear so as to move the blades apart. At the same time the space above the piston is in communication with the exhaust through ports 36 and 37. Upon rotating the plug 32 through ninety degrees, a reversal of connections takes place, throwing the space below the piston into communication with exhaust through the ports 35 and 37, and admitting motive fluid above the piston through the ports 38 and 36, thus forcing the cutting blades together.

It will thus be seen that I have provided a strong, simple, and compact power operated shear, which may be readily moved from place to place and easily manipulated to bring the cutting blades into the desired position, and it is thought that the numerous advantages of my invention will be readily appreciated by those skilled in the art.

What I claim is:—

1. A shear comprising a pair of arms having interlocked ears projecting from their inner sides, a pivot pin passing through openings in said ears, a pair of toggle levers pivoted to one end of said arms, a piston connected with the joint of said toggle levers, a power cylinder in which such piston works, and an eye-bolt on which said cylinder is supported mounted to rock on the pivot pin of the shear arms.

2. A shear comprising a pair of arms having interlocked ears projecting from their inner sides, a pivot pin passing through openings in said ears, a power cylinder for operating the shear disposed between the arms thereof, and an eye-bolt located between said interlocked ears and adapted to rock on the pivot pin connecting said ears, the shank of said bolt being screw threaded into the head of said cylinder and serving to support the same.

Signed at New York, in the county of New York, and State of New York, this 23rd day of December A. D. 1908.

GEORGE EDWARD PELLISSIER.

Witnesses:
JOSEPH P. CASEY,
D. T. HULBERT.